United States Patent [19]
Mizuta

[11] Patent Number: 6,113,121
[45] Date of Patent: Sep. 5, 2000

[54] FOOT BOARD FOR FOUR WHEELED ALL-TERRAIN VEHICLE, AND MOUNTING STRUCTURE OF A FOOT BOARD

[75] Inventor: Fumio Mizuta, Akashi, Japan

[73] Assignee: Kawasaki Jukogyo Kabushiki Kaisha, Kobe, Japan

[21] Appl. No.: 09/205,389

[22] Filed: Dec. 4, 1998

[30] Foreign Application Priority Data

Dec. 8, 1997 [JP] Japan .................................. 9-336850

[51] Int. Cl.$^7$ .............................. B60R 3/00; B60N 3/06
[52] U.S. Cl. ...................... 280/163; 280/291; 280/164.2; 296/75
[58] Field of Search .............................. 296/75; 280/291, 280/163, 164.1, 164.2

[56] References Cited

U.S. PATENT DOCUMENTS

| | | | |
|---|---|---|---|
| 2,084,019 | 6/1937 | Edwards | 280/163 |
| 2,088,739 | 8/1937 | Geyer | 280/163 |
| 4,203,611 | 5/1980 | Makela | 280/163 |
| 4,257,620 | 3/1981 | Okland | 280/164.1 |
| 4,728,121 | 3/1988 | Graves | 280/291 |
| 4,768,799 | 9/1988 | Millican | 280/291 |
| 5,090,715 | 2/1992 | Nakajima et al. | 296/75 |
| 5,501,475 | 3/1996 | Bundy | 280/169 |
| 5,738,180 | 4/1998 | Hofmann et al. | 280/291 |
| 5,893,424 | 4/1999 | Hisada | 296/75 |
| 5,961,138 | 10/1999 | Roark et al. | 280/291 |

FOREIGN PATENT DOCUMENTS

| | | |
|---|---|---|
| 60-179377 | 9/1985 | Japan . |
| 60-209373 | 10/1985 | Japan . |
| 63-61393 | 4/1988 | Japan . |
| 2-48289 | 2/1990 | Japan .................................... 280/291 |
| 0164681 | 6/1990 | Japan .................................... 296/75 |

*Primary Examiner*—Joseph D. Pape
*Assistant Examiner*—Kiran Patel
*Attorney, Agent, or Firm*—Marshall, O'Toole, Gerstein, Murray & Borun

[57] ABSTRACT

To provide foot boards which allow a rider to take a convenient position regardless of the rider's physique. In a four wheeled all-terrain vehicle having a body frame provided with substantially platelike foot board members for rider's resting feet at a lower position on both sides thereof, with a brake pedal being disposed to be depressed freely above an opening of one of the foot board members. A plurality of foot support members with the top surface thereof having an undulating configuration along the longitudinal direction thereof are disposed at intervals on the foot board members rearward the brake pedal for securely supporting the rider's foot. The foot support members are installed on the other foot board in a symmetrical configuration with respect to the center line of the vehicle body. Slip preventing members are positioned on the foot boards adjacent the foot support members to assist in maintaining the rider's feet on the foot boards.

10 Claims, 7 Drawing Sheets

FIG. 4A
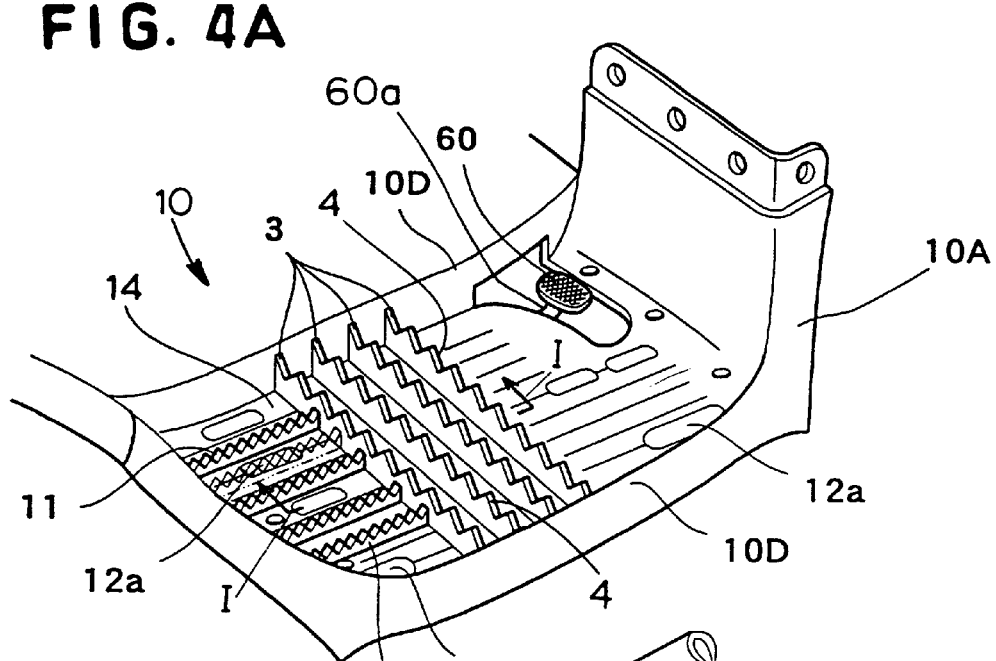
FIG. 4B
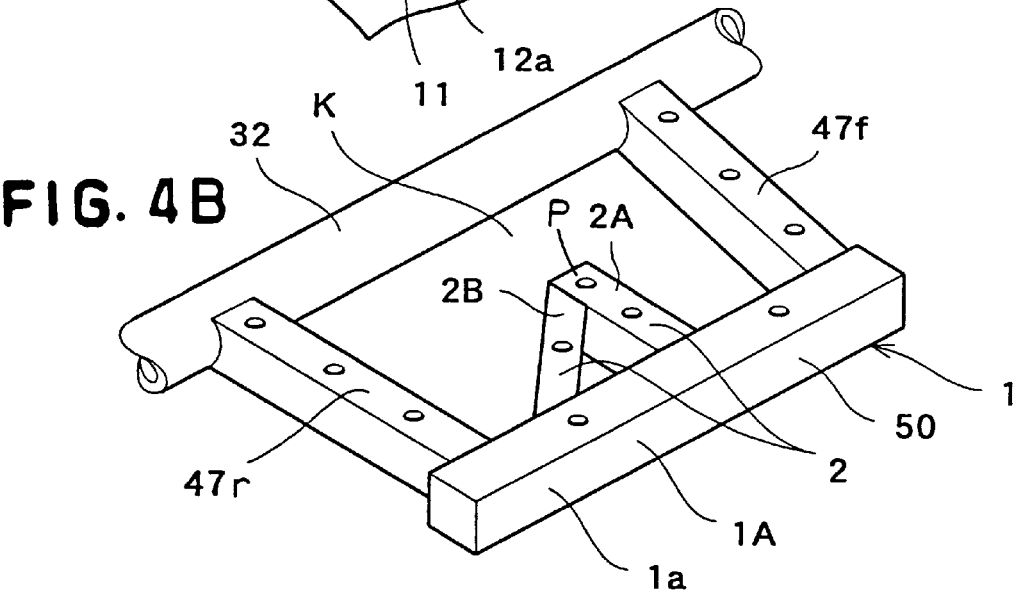
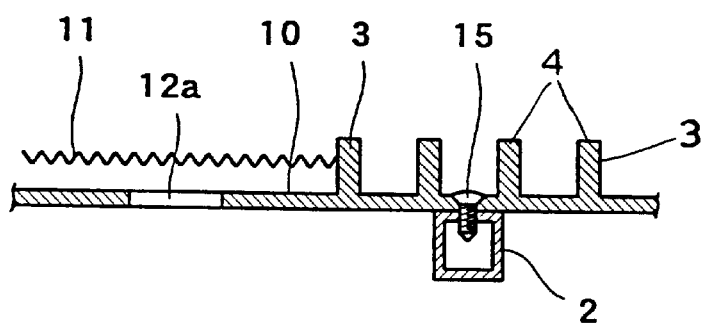
FIG. 4C

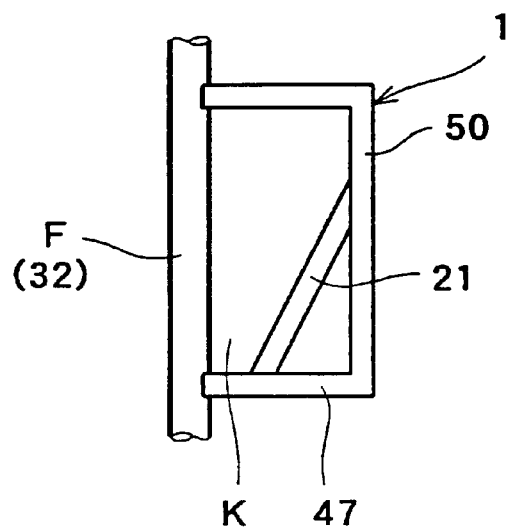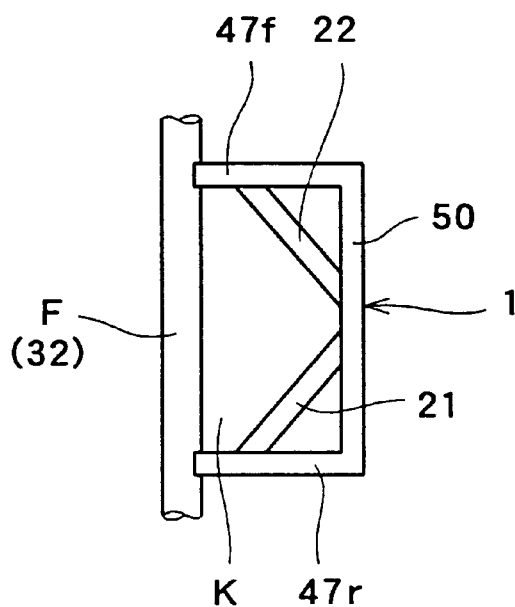
FIG. 6A  FIG. 6B
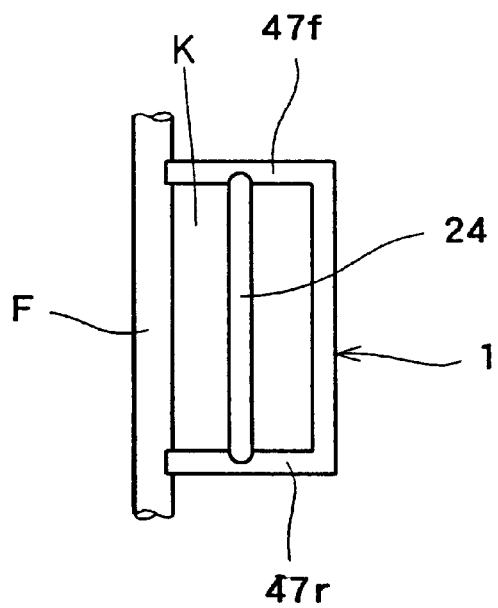
FIG. 7

FOOT BOARD FOR FOUR WHEELED ALL-TERRAIN VEHICLE, AND MOUNTING STRUCTURE OF A FOOT BOARD

FIELD AND BACKGROUND OF THE INVENTION

The present invention relates to a foot board for a four wheeled all-terrain vehicle on which a rider's foot is rested, and a mounting structure thereof.

The four wheeled all-terrain vehicle is capable of running over off-road such as sandy land, uneven ground surface, rugged hill and muddy land including water patches for the purpose of the vehicle. Consequently, the rider is exposed to splashing of muddy water coming from the front of the vehicle or below when driving.

Therefore, a front portion of the vehicle is provided with a front fender to prevent the rider from being exposed to muddy water or the like.

The four wheeled all-terrain vehicle includes foot rests which comprise foot rest bars provided on each side of the vehicle similarly to a motor cycle so that the rider can place the arch of a foot (or shoe) thereon. A brake pedal is provided in front of one of the foot rest bars to be operated by the tip of the foot (or shoe).

Because the rider is exposed to splashing of muddy water from below, a foot board (also referred to as a floor board) having foot board members shaped as a flat plate and joined to the front fender are provided instead of the foot rest bars. In this case an opening is formed in one of the foot boards at a position corresponding to a foot-operated brake pedal so that the brake pedal is exposed through the opening and above the foot board to be operated by the tip of the foot (or shoe) placed on the foot board.

There is a variation of the configuration described above, wherein a foot rest member having a cross section of an inverted U shape is installed on the foot board in the lateral direction of the vehicle at a position corresponding to the arch of a shoe over the foot boards, in order to make it easier for the rider to secure the feet on the foot boards and improve the operability of the brake pedal (Japanese Laid-Open Patent Publication No. 60-209373). That is, the foot rest member includes a cross section of inverted U shape which functions similarly to the foot rest bar and is disposed over the foot board.

In the case of the foot board type foot rest described above, in contrast to the foot rest bar type, the front end or rear end of the foot touches the foot board thereby making the foot unable to swing (rotate) back and forth freely around the foot rest member which is located over the foot board and supports the foot. Therefore it is necessary to operate the brake or support the rider's body by changing the position of the lower back(hip) of the rider's body or legs depending on the rider's riding position. Moreover, with the configuration described above, the unlimited motion of the foot on the foot board is restricted by the foot rest member of inverted U-shaped cross section protruding upward from the foot board and, depending on the rider's physique, occasionally the brake can be operated at a non-optimum foot position thus the operation of the brake is inconvenient.

Meanwhile, as shown in FIG. 8, the foot board shaped flat plate of the prior art is supported from below by a support member 12a (indicated by dashed line), which is installed to connect a support frame 12 (indicated by dashed line) and a main frame 32r laterally, at a middle of the support frame 12 installed to extend in a side out direction from the main frame 32r in C shaped configuration in plan view corresponding to the external shape of the foot board 10. With this configuration, the central portion of the foot board 10 which is subject to a strong force applied from above is supported by the support member 12a.

However, an arm member 60a, which is provided integrally with the brake pedal on the backside thereof for connecting to a member of the brake-unit (not shown), is supported at the base end thereof by a pivot pin 60b to be capable of freely swinging back and forth on the main frame 32r side. Therefore the arm member 60a extending in a direction perpendicular to the support member 12a installed in the lateral direction interferes with the support member 12a in plan view. In this case, it is necessary to locate the arm member 60a connected to the brake pedal further below the support member 12a. As a result, ground clearance of the vehicle becomes smaller.

SUMMARY OF THE INVENTION

Under these circumstances, the first invention has been accomplished, and an object thereof is to provide a foot board, for four wheeled all-terrain vehicle, that allows a rider to move the feet easily while supported on the foot board so as to take a convenient riding position, secure the feet positions and operate a brake conveniently.

It is an object of the second invention to provide a foot board mounting structure wherein a foot board does not deflect downward at the central portion even when the rigidity of the foot board is decreased, and an arm member connected to a brake pedal can be disposed at a higher position from the ground.

The object of the first invention can be achieved by the foot board described below. A foot board for a four wheeled all-terrain vehicle, the vehicle having the foot boards, made in substantially platelike configuration for a rider to rest the feet thereon, installed on each side of a lower portion of a body frame, and one of the foot boards having an opening for passing an arm member connected to a brake pedal therethrough and the brake pedal being disposed above the opening to be freely depressed, wherein; a plurality of foot support members having an undulating top surface, such as of sawtooth, sinusoidal, or jagged shape along the longitudinal direction thereof, are arranged at intervals (with a space) in-between in the lateral direction of the vehicle on one of the foot boards rearward the brake pedal. The foot support members are arranged at intervals (with a space) in-between in the lateral direction of the vehicle on the another one of the foot boards.

According to the foot board configured as described above, the foot support members can be arranged in a wide area on the foot boards, and therefore the rider can readily move the feet in supporting position along the top undulating surface of the foot support members, secure the feet at convenient places, and take a stable riding position. Also by setting an optimum position for the foremost foot support member with respect to the brake pedal, it is made possible for the rider to position the foot for easy brake operation on the foot support member located rearward the brake pedal, thus allowing the rider to select the optimum foot position in accordance with the rider's physique.

The object of the second invention can be achieved by the mounting structure of the foot board described below. A mounting structure of a foot board for a four wheeled all-terrain vehicle, the vehicle having foot boards, made in substantially platelike configuration for a rider to the rest foot thereon, installed on each side of a lower portion of a body frame, and one of the foot boards having an opening for passing an arm member connected to a brake pedal therethrough, and the brake pedal being disposed above the opening to be freely depressed, the foot boards are supported from below by foot board support frames having C-shaped configuration in plan view and being provided on both sides of the body frame, wherein the C-shaped foot board support frame on the side where the brake pedal is mounted is provided with a reinforcement member, for supporting the foot board, which is arranged at a position inward from the inner surface of an outside member of the foot board support frame so that there is such a clearance between the body frame which being attached the foot board support frame and the reinforced member that at least the arm member connected to the brake pedal is passed therethrough.

With this configuration, because the central portion of the foot board is supported from below by the reinforcement member, the foot board does not deflect downward when a load is applied from above. Also because the arm member connected to the brake pedal does not interfere with the foot board support frame and reinforcement member, the minimum height above ground of the arm member can be made higher than the bottom of the frame during normal running, and the arm member can be protected from below by the frame.

According to the foot board described above, it is preferable that the foot support members at the foremost and hindmost positions are disposed at a spacial distance therebetween of about 6 to 14 cm, with a plurality of foot support members disposed laterally at intervals in-between. The rider thus can supportingly move the feet along the top undulating surface of the foot support members and secure the feet at convenient positions.

According to the foot board described above, it is preferable that a plurality of slip preventing members having a top undulating surface along the longitudinal direction thereof are positioned at intervals in-between and at a lower height than the foot support members. The slip preventing members are arranged to be perpendicular to the foot support members and extend to the rearward from the hindmost foot support member, thereby preventing the rider's heel from falling off behind the foot support member or slipping on the foot board.

According to the foot board described above, it is preferable that the foot support members are each formed of plate-shaped members so that light-weight and reliable foot support members can be obtained easily. Alternatively the foot support members can be formed of a plurality of vertical pedestals or columns extending at differing heights above the foot board support floor to present an undulating top surface, such as a sawtooth shaped top surface.

According to the foot board described above, it is preferable that the slip preventing members are each formed of plate-shaped members so that light-weight and reliable slip preventing members can be obtained easily.

According to the mounting structure of the foot board described above, it is preferable that the reinforcement member can be made in a triangular shape with an apex directed toward the body frame in plan view (refer to triangular shape in FIG. 4(a)) so that the central portion of the foot board can be supported over a wide area.

According to the mounting structure of the foot board described above, it is preferable that the reinforcement member can consist of a member disposed obliquely toward an outer member from a front or rear member of the C-shaped foot board support frame in the running direction of the vehicle, in which case, the foot board is supported at the central portion thereof by the reinforcement member, and the foot board support frame is made in a highly rigid structure.

BRIEF DESCRIPTION OF THE DRAWINGS

FIG. 4 shows a foot board on a brake pedal side and the foot board mounting structure of the four wheeled all-terrain vehicle shown in FIG. 1, with FIG. 4(a) being a perspective view of the foot board from rearward, and FIG. 4(b) being a perspective view of a foot board support frame, and FIG. 4(c) being a cross sectional view in I—I direction of FIG. 4(a) showing the foot board mounting structure.

FIGS. 6(a) and (b) are partial plan views showing the configuration of a foot board support frame of two other respective embodiments of the present invention.

FIG. 7 is a partial plan view showing the configuration of a foot board support frame of a further embodiment of the present invention.

DETAILED DESCRIPTION OF THE PREFERRED EMBODIMENT

In the following, a specific description will be given on a foot board for a four wheeled all-terrain vehicle and a mounting structure thereof according to the embodiments of the present invention, with reference to the accompanying drawings.

Figure 1:
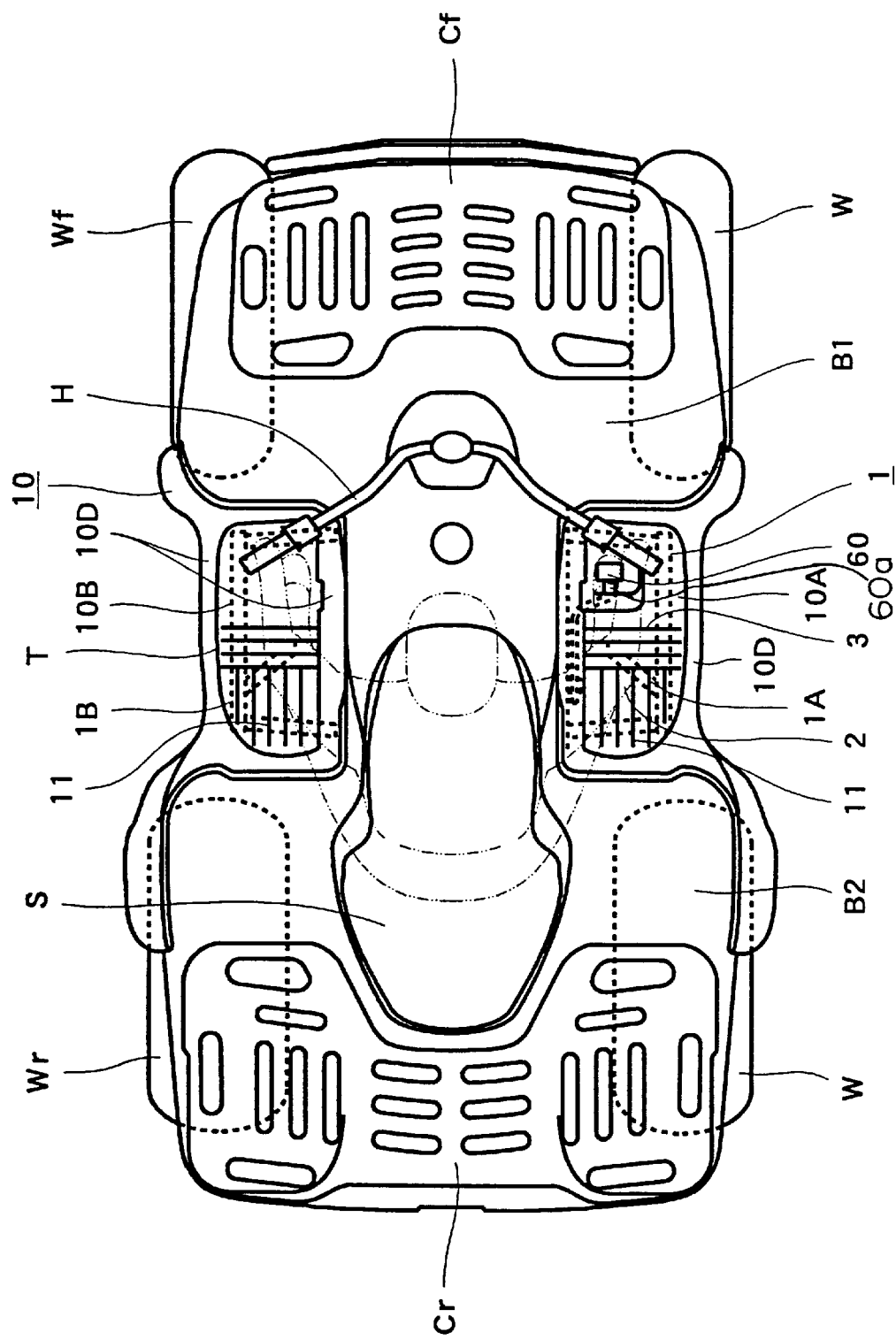
FIG. 1 is a plan view showing a four wheeled all-terrain vehicle of the present embodiment.
Figure 2:
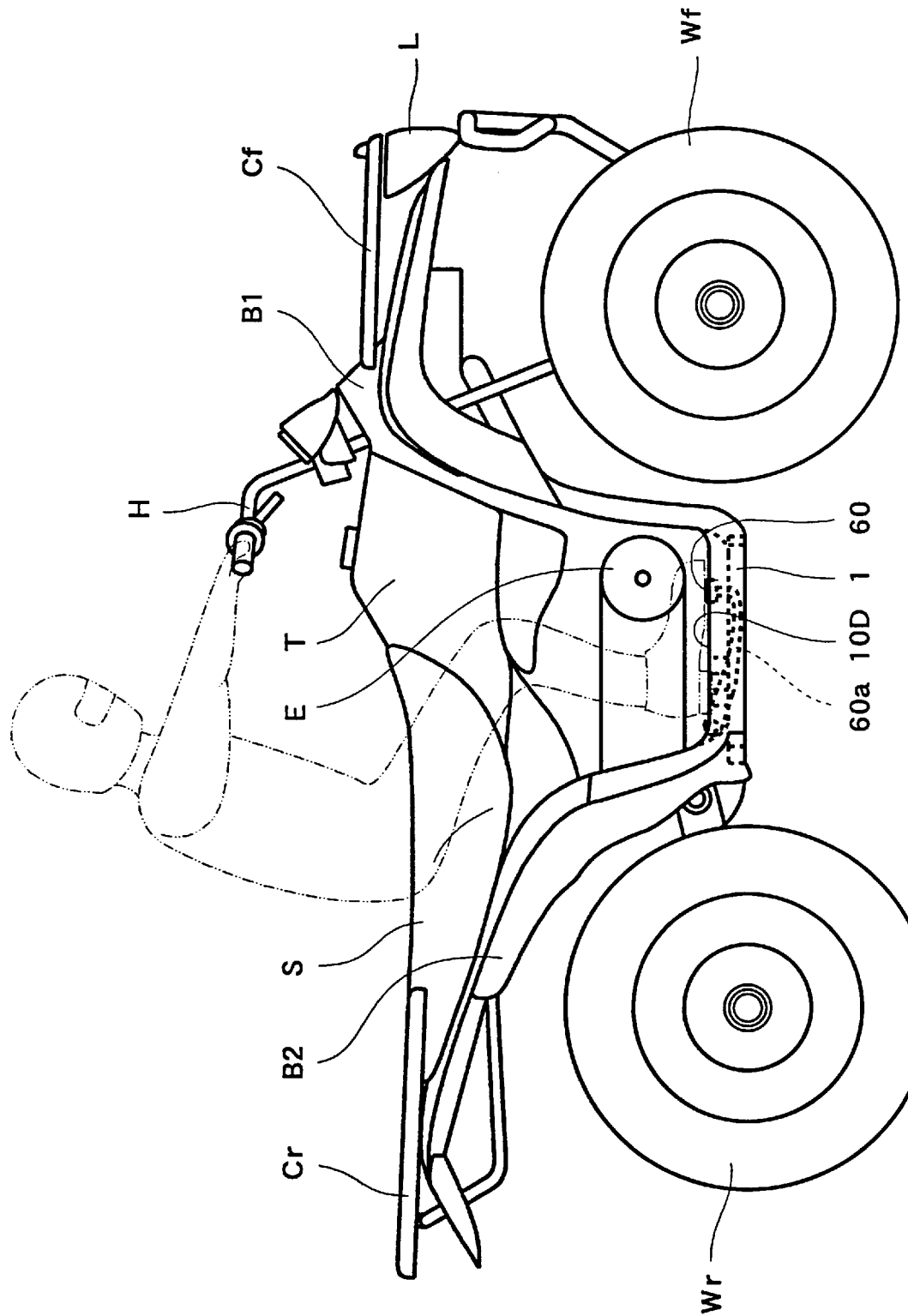
FIG. 2 is a side view showing the four wheeled all-terrain vehicle shown in FIG. 1.

The four wheeled all-terrain vehicle of this embodiment is provided with foot boards 10 (10A, 10B) on each side of a vehicle at a lower portion as shown in FIG. 1 and FIG. 2. The four wheeled all-terrain vehicle has an engine E, a transmission system (not shown) consisting of an axle, differential gears and other components, wheels W, a battery (not shown), a fuel tank T, a seat S and a handlebar H shown in FIG. 1 and FIG. 2 which are attached or mounted on a body frame F of the vehicle shown in FIG. 3. The front wheels Wf are covered by a front fender B1 and the rear wheels Wr are covered by a rear fender B2, and a carrier Cf,Cr for carrying luggage are mounted over the fenders B1, B2.

Figure 3:
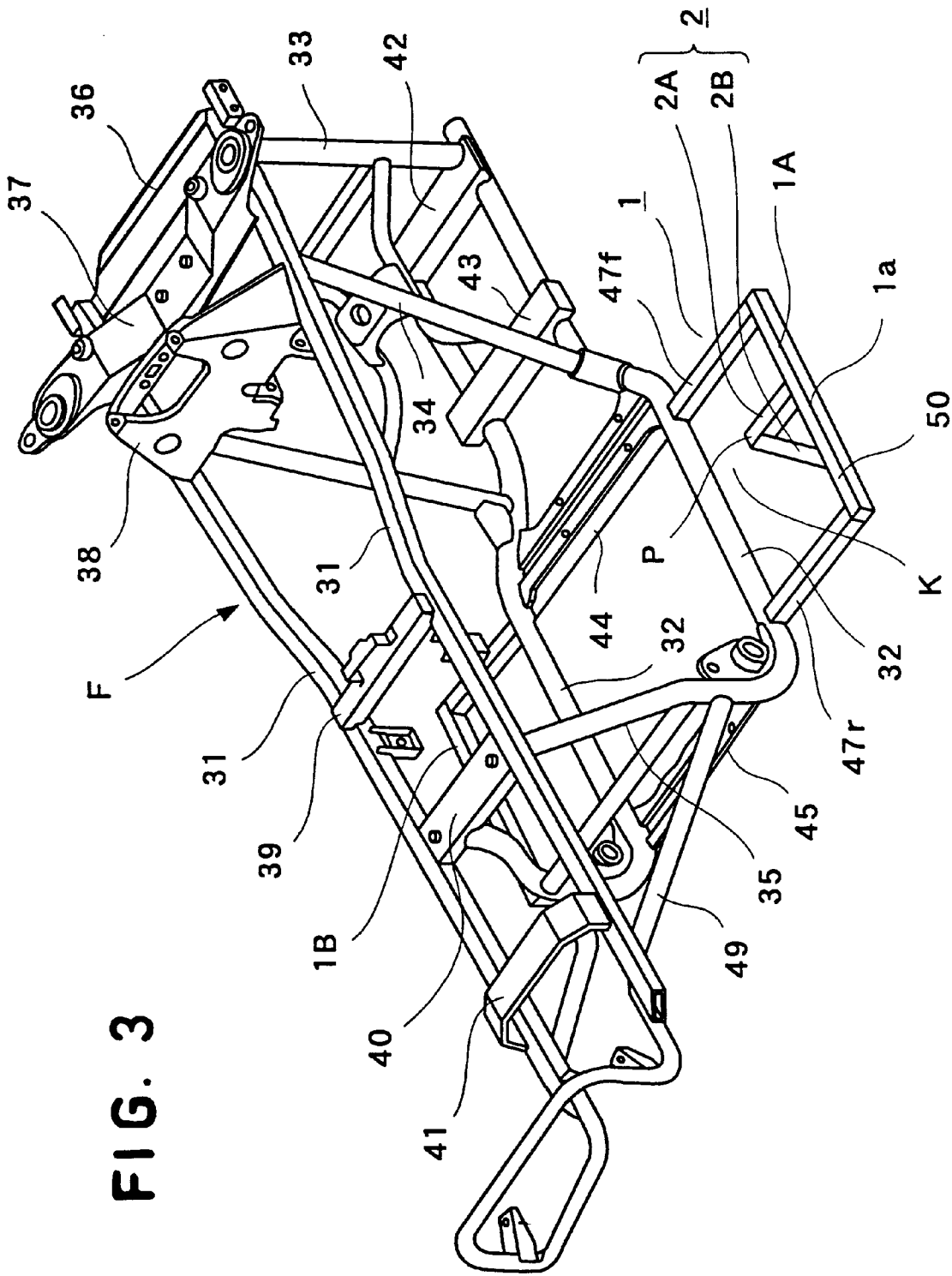
FIG. 3 is a perspective view showing the structure of the body frame of the four wheeled all-terrain vehicle shown in FIG. 1.

Disposed at a lower portion of the body frame F on both sides are foot board support frames 1 (1A, 1B) installed symmetrically with respect to the center line of the body frame for supporting the rider's feet. As shown in FIG. 3, outer frame 1*a* of each of the foot board support frames 1 utilizes a part of a main lower member 32 which extends from the front to the rear at a lower portion of the body frame F on both sides. The outer frame 1*a* is made in a C-shaped configuration in plan view, by installing step members 47*f*, 47*r* on the main lower member 32 to protrude in the transverse direction therefrom, the step members 47*f*, 47*r* being disposed at the front and rear to oppose each other and are connected by a connecting member 50. The foot board support frame 1 therefore has the outer frame 1a with C-shaped configuration in plan view, and which includes the front and rear step members 47f,47r and the connecting member 50.

Figure 5A:
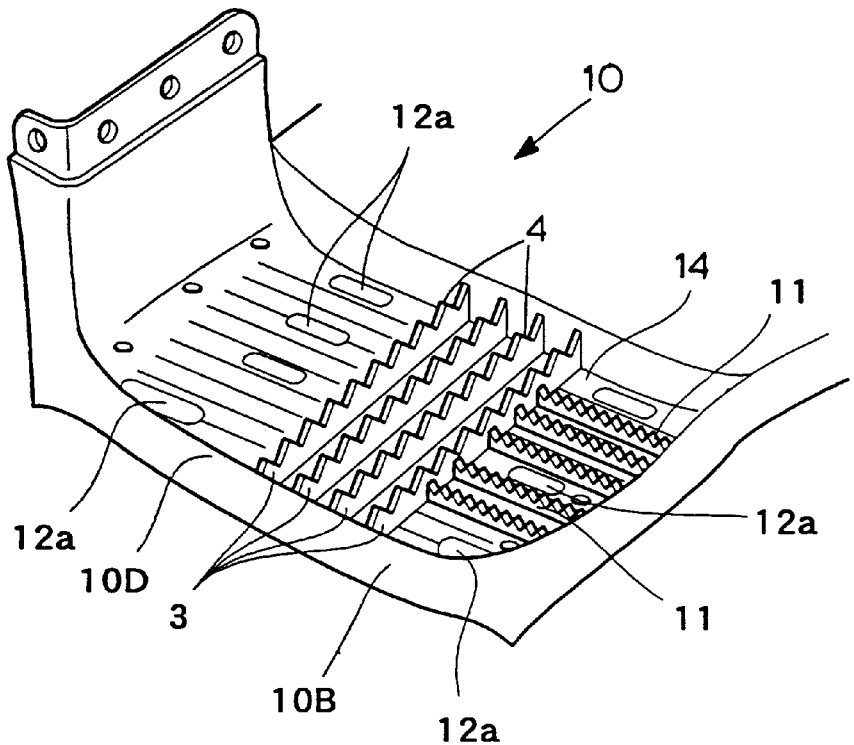
FIG. 5 shows a foot board on the non-brake pedal side and a foot board mounting structure of the four wheeled all-terrain vehicle shown in FIG. 1, with FIG. 5(a) being a perspective view of the foot board from rearward, and FIG. 5(b) being a perspective view of the foot board support frame.
Figure 5B:
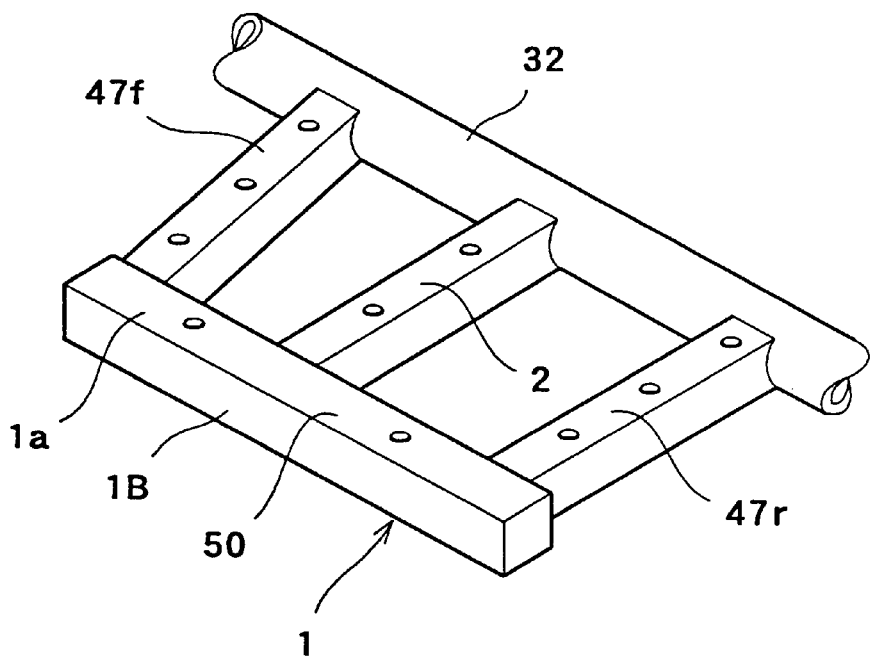
Figure 8:
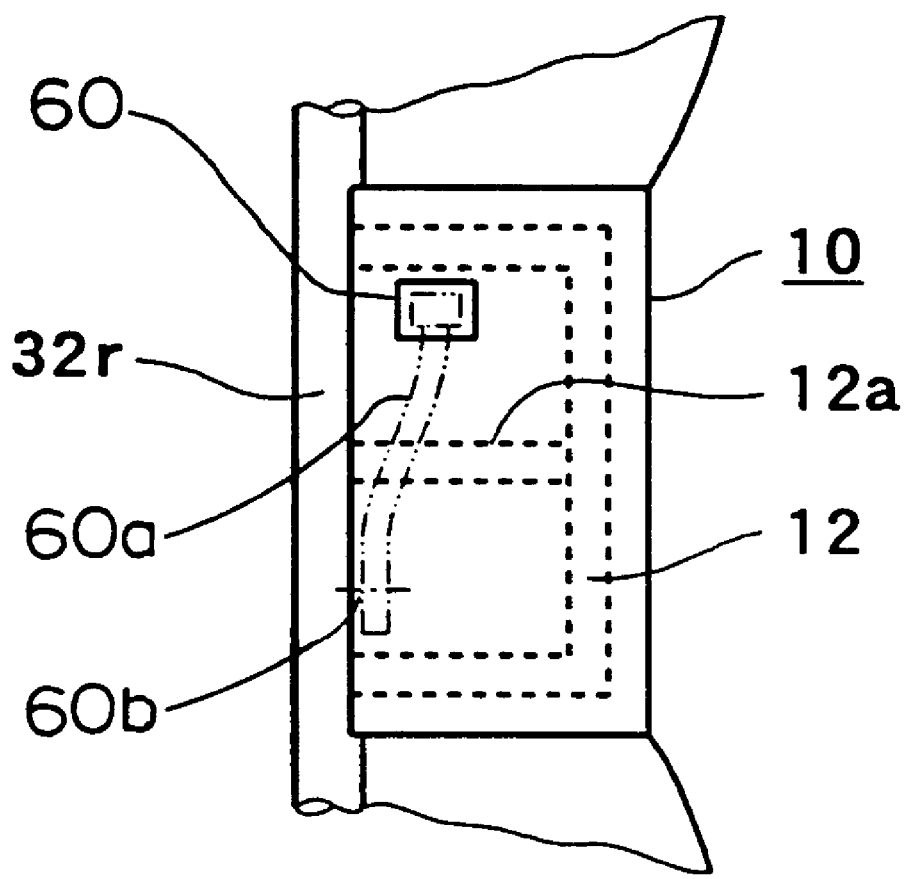
FIG. 8 is a partial plan view showing the configuration of a foot board and a foot board support frame of the prior art.

Installed inside the connecting member 50 used as the outer member of the outer frame 1a is a reinforcement member 2 as shown in FIGS. 4(b) and 5(b). The reinforcement member 2 in FIG. 4(b) comprises a lateral member 2A extending from the inside of the outer connecting member 50 inward toward the body frame F in the lateral direction and an oblique member 2B which obliquely connects the lateral member 2A and the connecting member 50. The connecting member 50, the lateral member 2A and the oblique member 2B are joined by welding, thereby forming a triangular rigid frame in plan view. Screws 15 may be used to mount the foot board 10 to the foot board support frame.

Formed between the main lower member 32 of the body frame F and a joint portion P connecting the lateral member 2A and the oblique member 2B, is a clearance K through which an arm member 60a, connected integrally to a foot pedal 60 as shown in FIGS. 1, 2 3, 4(a), 4(b) passes with a margin.

The reinforcement member 2 may also be constituted of a member 21 which obliquely connects the connecting member 50 and the front or rear step member 47 extending laterally from the body frame F (main lower member 32) as shown in FIG. 6(a), or may alternatively be constituted of members 21, 22 which obliquely connect the connecting member 50 and the front and rear step members 47f,47r extending laterally from the body frame F (main lower member 32), respectively, as shown in FIG. 6(b).

The reinforcement member 2 may have any configuration that is capable of supporting the foot board 10 at the central portion in the longitudinal direction and has the necessary clearance K from the main lower member 32 so that the arm member 60a of the brake pedal 60 passing therethrough can be employed.

The reinforcement member 2 installed on the left of the body frame F where the brake pedal 60 is not arranged may have the same configuration as described above, or alternatively the reinforcement member 2 may be installed to connect the connecting member 50 and the main lower member 32 in the lateral direction as shown in FIG. 5(b), instead of the configuration described above. The reinforcement member 2 may also be a member 24 which extends in the longitudinal direction to connect the front and rear step members 47f,47r extending laterally from the body frame F (main lower member 32) as shown in FIG. 7. Upon consideration of the arrangement of the member 24 for avoiding interference with the arm member 60a of the brake pedal 60, it can be understood that such a configuration as shown in FIG. 7 may be employed for the reinforcement members on both sides of the body frame.

The body frame F of the vehicle shown in FIG. 3 will be described below. The right and left main lower members 32,32 are connected by cross members 42, 43, 44, 45. Installed over the main lower members 32,32 are main upper members 31,31 extending in the longitudinal direction symmetrically on the right and left of the body frame, with the right and left main upper members 31,31 being connected by cross members 36, 37, 38, 39, 40, 41.

The main lower members 32 and the main upper members 31 are connected vertically by side members 33, 34, 35. The rear end of the main upper members 31 are connected to the side member 35 by an oblique member 49.

The body frame F is made in a highly rigid frame structure as a whole by welding the joints of the members.

The engine E, the fuel tank T, the seat S, the wheels W, a cover (body) B, the carriers C, the handlebar H, headlights L and other components are mounted on the body frame F as shown in FIG. 1 and FIG. 2.

As shown in FIG. 1 and FIG. 2, the front fender B1 covers the right and left front wheels Wf and the portion in-between of the front wheels, and the rear fender B2 covers the right and left rear wheels Wr and the portion in-between of the rear wheels.

The right and left foot boards 10 (10A in FIG. 4(a), 10B in FIG. 5(a)) are disposed so that the front ends thereof are joined with the rear ends of the front fender B1 and the rear ends thereof are joined with the front ends of the rear fender B2. The foot boards 10 are attached to the foot board support frames 1A, 1B which are disposed at the lower end portion on both sides of the body frame F. The periphery or outer dimensions of the foot boards 10 is substantially identical with and preferably slightly larger than the outer frame 1a of the foot board support frame 1. Consequently, the foot boards 10 are supported on the periphery thereof from below by the outer frame 1a of the foot board support frame 1. Also the foot boards 10 are supported at the central portion thereof from below by the triangular reinforcement member 2 shown in FIG. 4(b).

The foot boards 10, in the condition of being installed on the body frame F, have a plurality of upstanding foot support members 3, such as vertical plate-shaped members 3 protruding upwardly from the foot board floor 14. The top surface portions 4 of the foot support members 3 are formed in an undulating shape such as a sawtooth configuration in the longitudinal direction thereof as shown in the embodiments of FIG. 4(a) and FIG. 5(a) with the top portions of the sawtooth on the plate-shaped members being substantially at the same height. The foot support members 3 are disposed in the lateral direction of the vehicle at spaced intervals over a specified range rearward from a reference position which is rearward of the brake pedal 60. In the case of this embodiment, four vertical foot support members 3 are disposed at equal spaced intervals over a total space of about 10 cm rearward from the reference position which reference position is about 12 cm rearward of the center of the brake pedal 60. The reference position is determined to be the point(place) where a rider can easily press the brake pedal downwardly to a lower position than the top surface of the foot support members by his foot tip while keeping said foot in contact with the foot support member 3. The position of hindmost foot support member 3 is determined to be the point where a rider can engage his heel with a backface of the hindmost foot support member 3 during driving, for example, driving on a down slope. Consequently, a preferable reference position, for example, may be about 8 to about 14 cm rearward of the center of the brake pedal 60, and the foot support members 3 can be spacially separated over a total space of from about 6 cm to about 14 cm within this invention so that the foot support member 3 is provided for supporting the rider's foot.

Also, in this embodiment, as shown in FIG. 4, and FIG. 5, a plurality of slip preventing members 11 with the top surface formed in an undulating shape such as a sawtooth configuration in this embodiment, in the longitudinal direction thereof are disposed at spaced intervals perpendicular to the foot support members 3 (in the longitudinal direction of the vehicle) extending rearward from the hindmost foot support member 3. The slip preventing members 11 are disposed on the foot board floor 14 at a height lower than the foot support members 3 so as to engage the heel of the rider with a backface of the hindmost foot support member 3.

In this embodiment, the foot support members 3 and slip preventing members 11 on each foot board 10 are substantially symmetrically arranged with respect to the center line of the body frame. A non-symmetrical configuration may also be employed if necessary.

Further, raised portions 10D are formed on both sides of the foot boards 10 to a height higher than the foot support members 3, in order to reinforce the foot boards 10 and to assist in maintaining the rider's feet on the foot boards 10.

In this embodiment, the foot board 10 and the foot support members 3 thereon are formed in an integral body made of polypropylene (PP) reinforced with glass fiber, in order to reduce the weight, improve the strength and rigidity and make the assembling easier. The foot board 10 and the foot support members 3 also may be made of metal. The height of the sawtooth-shaped foot support members 3, at the highest of top surface portion 4 thereof, is preferably about 10 to 20 mm from a floor surface 14 of the foot board 10, and is set to about 12 mm in this embodiment. However, the sawtooth-shaped foot support members 3 and the foot board 10 can be made separately and joined together by means of bolts or the like. If desired, different materials can be used, for example, glass fiber-reinforced polypropylene (PP) for the foot board member 10 and a metal such as aluminum for the foot support members 3.

The foot support members 3 also may be formed by using members having a U-shaped cross section each providing two foot support members. Rather than the illustrated sawtooth-shaped top surface of the foot support members, other undulating shapes, such as sinusoidal or a jagged shape can be used with the tops of the sinusoid or jagged shape on the foot support members being substantially at the same height. It is understood that rather than the individual plate-shaped foot support members 3, a series of vertical pedestals extending from the foot board floor plate can be used with the top of the pedestals presenting an undulating top surface for securing and supporting the rider's foot.

The foot board 10 has a plurality of through holes 12a of elliptic (or circular, not shown) shape in plan view formed in the floor 14 as shown in FIGS. 4(a), and 5(a), so that mud or sand accumulated on the foot boards 10 can be dropped below.

The foot boards 10 are placed at such positions that, as in the prior art, when the rider sits astride on the seat S, holds the handlebar H with both hands and places feet on the foot boards 10 as shown in FIG. 1 in plan view and FIG. 2 in side view, the legs are bent naturally.

With the foot boards 10 made in the configuration described above, because the foot support members 3 are installed over a wide range on the foot boards 10, the rider can move the feet on the top of the undulating surface 4 of the foot support members 3 and take a stable riding position while securing and supporting the feet at proper positions. Also by setting a proper position of the foremost foot support member 3 with respect to the brake pedal 60, the rider can place the foot at a position on the foot support member 3 where the brake can be operated conveniently, thus it is made possible to select an optimum position according to the rider's physique. Also because the slip preventing members 11 are installed rearward the hindmost foot support member 3, it is made possible to prevent the heel from falling off rearward the foot support members 3.

With the structure of mounting the foot board made in the configuration described above, because the foot board members 10 are supported from below by the reinforcement member 2 also at the central portion thereof, the foot board members 10 can be prevented from deflecting downward even when the rigidity of the foot boards 10 is decreased.

Further, because the clearance K, through which the arm member 60a of the brake pedal 60 passes, is provided between the reinforcement member 2 installed on the foot board support frame 1 for supporting the foot board 10 and the main lower member 32 of the body frame F, the lowest height of the arm member 60a, from the ground during normal running can be made higher than the bottom surface of the frame 1, thus making the configuration effective for protecting the arm member integrally connected to the brake pedal 60.

The foregoing detailed description has been given for clearness of understanding only, and no unnecessary limitations should be understood therefrom, as modifications will be obvious to those skilled in the art.

What is claimed is:

1. A foot board in combination with a four wheeled all-terrain vehicle having a brake pedal, said foot board having a floor plate configuration for a rider to rest a foot thereon, including an opening in said floor plate for through passage of a brake arm member connected to the brake pedal so that said brake pedal is disposed above said foot board floor opening for ready depression by a rider's foot, said foot board comprising:

a plurality of foot support members having an undulating top surface along the longitudinal direction thereof;

said foot support members arranged at spaced intervals on said floor plate and rearward of said brake pedal; and said undulating top surfaces at a height projecting above said floor plate such that the rider's foot can be placed on said undulating top surfaces.

2. The foot board in combination with the four wheeled all-terrain vehicle according to claim 1, wherein the longitudinal direction of said foot support members are arranged substantially along the lateral direction of the vehicle.

3. The foot board in combination with the four wheeled all-terrain vehicle according to claim 2, wherein said foot support members are each plate-shaped members projecting upwardly from the floor plate.

4. The foot board in combination with the four wheeled all-terrain vehicle according to claim 1, wherein said plurality of foot support members extend over a total distance of about 6 cm to about 14 cm, rearwardly of and extending away from said brake pedal.

5. The foot board in combination with the four wheeled all-terrain vehicle according to claim 1, including a plurality of longitudinal slip preventing members having an undulating top surface along the longitudinal direction thereof, said longitudinal slip preventing members positioned on said floor plate along the longitudinal direction of the vehicle and opposite said brake pedal with said undulating top surface of said slip preventing members being below the height of said undulating top surface of said foot support members.

6. The foot board in combination with the four wheeled all-terrain vehicle according to claim 5, wherein said slip preventing members are each plate-shaped and are protruding upstanding from the floor plate.

7. The foot board in combination with the four wheeled all-terrain vehicle according to claim 1, wherein said foot support members are each plate-shaped arid formed integrally with said floor plate and made of plastic material.

8. A mounting structure a foot board in combination with a four wheeled all-terrain vehicle, said vehicle having foot boards made in substantially platelike configuration for a rider to rest a foot thereon, installed on each side of a lower portion of the vehicle, and one of the foot boards having an opening for passing an arm member connected to a brake pedal therethrough and said brake pedal being disposed above said opening to be freely depressed, said foot boards are supported from below by foot board support frames having C-shaped configuration in plan view and being provided on both sides of a lower portion of a body frame, wherein:

said C-shaped foot board support frame on the side where said brake pedal is mounted is provided with a reinforcement member, for supporting the foot board, which is arranged at a position inward from the inner surface of an outside member of said foot board support frame so that there is such a clearance between the body frame, which being attached said foot board support frame, and the reinforcement member that at least the arm member connected to the brake pedal is passed therethrough.

9. The mounting structure of the foot board in combination with the four wheeled all-terrain vehicle according to claim 8, wherein said reinforcement member has a triangular shape with an apex directed toward said body frame in plan view.

10. The mounting structure of the foot board in combination with the four wheeled all-terrain vehicle according to claim 8, wherein said reinforcement member is disposed obliquely toward an outer member from a front or rear step member of said C-shaped foot board support frame in the running direction of the vehicle.

* * * * *